United States Patent

[11] 3,548,898

| [72] | Inventor | Vincenzo Napolitano |
| | | Via delle Rose, Inzago, Milan, Italy |
| [21] | Appl. No. | 813,093 |
| [22] | Filed | Apr. 3, 1969 |
| [45] | Patented | Dec. 22, 1970 |
| [32] | Priority | Apr. 10, 1968 |
| [33] | | Italy |
| [31] | | 15,062/68 |

[54] CHUCK FOR CLAMPING AND INFLATING A TUBELESS TYRE ON A RASPING OR ROLLING MACHINE
3 Claims, 2 Drawing Figs.

[52] U.S. Cl. .................................................. 144/288,
157/13
[51] Int. Cl. .................................................. B29h 21/00
[50] Field of Search ........................................... 144/288—1;
157/13, WH; 269/(Inquired); 279/(Inquired);
18/18F

[56] References Cited
UNITED STATES PATENTS

| 2,960,130 | 11/1960 | Smyser | 144/288 |
| 2,979,091 | 4/1961 | Noall | 144/288 |
| 3,291,171 | 12/1966 | Lehmann | 144/288 |

*Primary Examiner*—Donald R. Schran
*Attorney*—Yount, Flynn and Tarolli

ABSTRACT: A chuck for clamping and inflating a tubeless tyre on a rasping or rolling machine, comprising a hollow central body member rotating about a hollow supporting rod, a plurality of interchangeable segmental elements for radially sliding relative to said central body member and clamping on the tyre, a control unit for causing a simultaneous radial sliding for all of said segmental elements, the chuck also comprising a plurality of channels for the passage of compressed air designed to inflate said tyre.

PATENTED DEC 22 1970 3,548,898

INVENTOR.
VINCENZO NAPOLITANO
BY
Young, Flynn & Tarolli
ATTORNEYS

CHUCK FOR CLAMPING AND INFLATING A TUBELESS TYRE ON A RASPING OR ROLLING MACHINE

This invention relates to a chuck for clamping and inflating a tubeless tyre on a rasping or rolling machine.

Such machines are used for tyre retreading and chucks according to the present invention are used in pair opposite to each other to clamp therebetween the tyre to be processed.

The known devices heretofore used on the above machines comprise pairs of stationary rims for clamping therebetween the tyre to be processed.

The disadvantage in these devices is that owing to the actual diameter differentials existing indifferent make tyres having the same major diameters, centering defects would occur leading to an uneven processing for the tyre (unduly rasped at some areas and too insufficient rasped at other areas).

A further disadvantage in known devices is that the device rims have to be changed when passing from one to another size of tyres. Since large sized and thus substantially heavy rims are involved, the operation or handling is rather complex.

Therefore, the object of the present invention is to provide a chuck of the above character for removing the disadvantages of known devices and also having further advantages which will be apparent as the following description proceeds.

More particularly, it is the object of the present invention to provide such a chuck as above-mentioned, characterized by comprising a hollow central body member rotating about a supporting hollow rod; a plurality of interchangeable segmental elements for radially sliding relative to said central body member and clamping on the tyre; a control unit for causing the simultaneous radial sliding for all of the segmental elements; the chuck also comprising a plurality of channels for the passage of compressed air designed to inflate tyre.

The accompanying drawing schematically shows by way of non-restrictive example an embodiment for the chuck according to the present invention, and more particularly:

Figure 1:
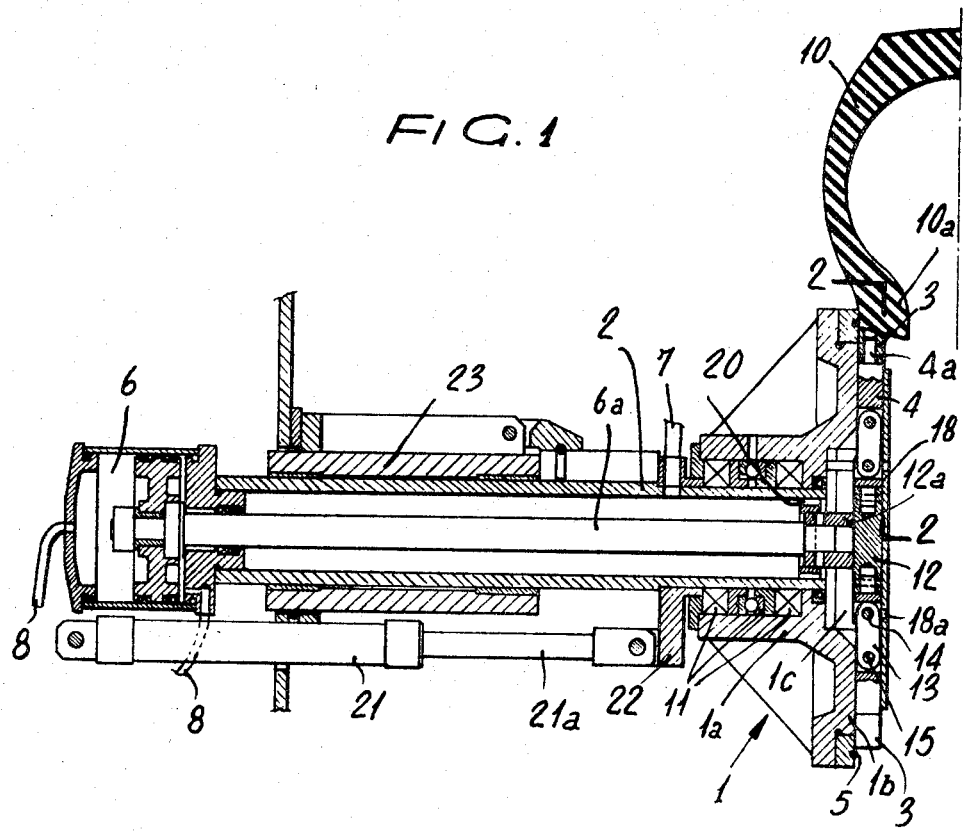
FIG. 1 is a cross-sectional view of the chuck.
Figure 2:
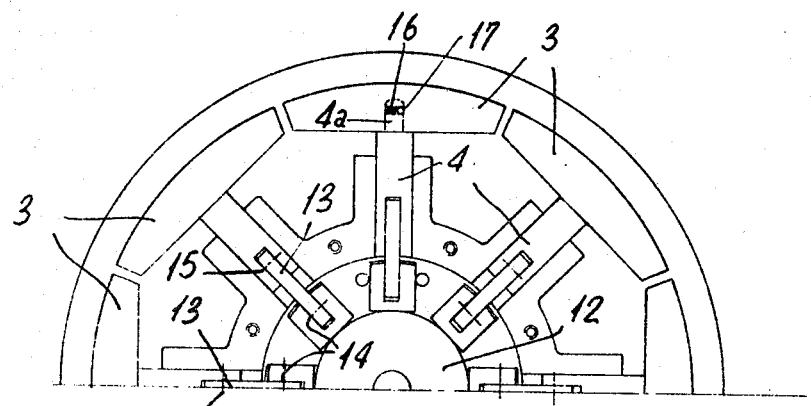
FIG. 2 is a cross-sectional view of the chuck as taken along line 2–2 of FIG. 1.

For better understanding the following description, it should be taken into account that in FIG. 1 the tyre 10 is clamped between the chuck, to be described hereinafter in detail and according to the present invention, and a fully similar further chuck which is coaxial with and opposite to the chuck being described.

Referring to the figures of the drawing, it will be seen that the chuck for clamping and inflating a tubeless tyre on a rasping or rolling machine according to the present invention comprises a hollow central body member 1 rotating about a hollow supporting rod 2, wherein said hollow central body member 1 is substantially shaped as a sleeve 1a provided at its outer end with a projecting annular flange 1b and wherein a plurality of rolling bearings 11 are inserted between said sleeve 1a and central supporting rod 2.

A plurality of interchangeable segmental elements 3 are capable of radially sliding with respect to said central body member 1 and clamping on tyre 10, more particularly on the bead 10a thereof, as a result of the operation of a control unit causing the simultaneous radial sliding for all of the segmental elements.

This control unit comprises a double-acting pneumatic cylinder-piston unit 6, the piston stem 6a thereof being axially slidable within the hollow supporting rod 2 and terminating with a central supporting element 12. A plurality of connecting rods 13 radially project from said central supporting element, each of these connecting rods being pivoted through a pin 14 to said element 12 and through a pin 15 to a segment-holder support 4, the number of such segment-holder supports being the same as that of the aforesaid interchangeable segmental elements 3.

Both the central body member 12 and the segment-holder supports 4 radial cavities or bores for accommodating said connecting rods 13.

Each of said supports 4 outwardly terminate with a spoke 4a for engaging a corresponding cavity or bore in segmental element 3, a conventional coupling device (such as by a spring 16 and ball 17) being provided for clamping the segmental element 3 with respect to said spoke 4a.

Each of the segmental elements 3 outwardly have a curved surface the radius of curvature of which substantially corresponding to that of the tyre to be processed.

The positioning for the segment-holder supports 4 is such that they are allowed to radially slide between said flange 1b of body member 1 and a guide plate 18 fast with flange 1b of body member 1 by pins passing through bores in supports 4. This flange projects radially of the central element 12. At the area where said sleeve 1a of body member 1 connects, said flange flange 1b of body member 1 has a flarding defining a cavity 1c wherein said central element 12 can slide and draw said connecting rods 13 therewith.

The chuck of the invention also comprises a plurality of channels for the passage of compressed air designed to inflate said tyre 10.

These channels comprise a first flexible conduit 7 opening within said hollow supporting rod 2, a conduit formed of the gap between said hollow rod 2 and stem 6a of the control unit, a plurality of holes 20 on the supporting bush 29 carrying said central element 12 at a sleevelike portion 12a thereof and inserted on the end of stem 6a.

Said channels for air passage also comprise the above-mentioned cavity 1c as well as a plurality of holes 18a passing through said guide plate 18 and connecting said cavity 1c with the interior of said tyre.

Although per se known and not forming the subject of the present invention, there is shown in FIG. 1 a pneumatic cylinder piston unit 21, the cylinder of which is fast with the frame of the rasping or rolling machine and the stem of which operates through a flange 22 on the hollow rod 2 of the chuck. Therefore, this unit is capable of causing the whole unit to slide relative to the guide bush 23 fast with the machine frame.

The operation of the chuck according to the present invention is as follows:

First, the interchangeable segmental elements 3 are positioned by insertion on the segment-holder supports 4 after selecting the segmental elements fitted for the diameter of the tyre to be processed.

By operating on the pneumatic cylinder piston unit 21, the entire assembly of the chuck according to the present invention is positioned and similarly the chuck opposite thereto (not shown in the drawing) is positioned, the tyre 10 is inserted between the two chucks as shown in FIG. 1, and then by suitably operating the pneumatic cylinder piston unit 6, such a displacement is caused for stem 6a and hence for central element 12 and connecting rods 13, that supports 4 and segmental elements 3 are so radially moved as to perfectly center said tyre 10, the bead 10a of which being clamped between the innermost ends of flanges 1b by the two opposing chucks. These surface are provided with annular sealing gaskets 5.

Compressed air is then caused to pass through one or both of the two opposing chucks via the above described conduit 7 and channels to completely inflate said tyre 10. The two chucks are then conventionally rotated and thus tyre 10 is also rotated.

From the foregoing disclosure it appears that the chuck according to the present invention will overcome the disadvantages provided by the prior devices.

Particularly, a perfect centering is achieved due to expansion of segmental elements 3 engaging on the bead 10a of tyre 10.

Further, when having to pass from one to another size of tyre, it will suffice to change the several segmental elements by a much simpler and faster operation than required by conventional devices.

Modifications and changes can be made to the chuck according to the present invention without departing for this from the covering field of the invention.

I claim:

1. A chuck for clamping and inflating a tubeless tyre on a rasping or rolling machine, comprising a hollow central body member rotating about a hollow supporting rod, a plurality of interchangeable segmental elements for radially sliding relative to said central body member and clamping on the tyre, a control unit for causing a simultaneous radial sliding for all of said segmental elements, the chuck also comprising a plurality of channels for the passage of compressed air designed to inflate said tyre, said control unit comprises a double-acting pneumatic cylinder piston unit, having the piston stem axially slidable within said hollow supporting rod and terminating with a central supporting element, a plurality of connecting rods supported on and pivoted to said element and radially projecting therefrom, a plurality of supports each of which being pivoted to one of said connecting rod for supporting one segmental element and radially slidable between the central body member of the chuck and a guide plate fast with said body member and radially projecting relative to said central supporting element.

2. A chuck according to claim 1, wherein said hollow central body member is substantially shaped as a sleeve provided at its outer end with a projecting annular flange, a plurality of rolling bearings being inserted between said sleeve and said central supporting rod.

3. A chuck according to claim 1, wherein said channels for compressed air passage comprise a flexible conduit opening within said hollow supporting rod, a conduit formed of the gap between said hollow rod and the piston stem, a chamber between said hollow central body member and said central control element communicating with said conduit through holes in the supporting bush of said central element, and a plurality of holes through said guide plate and connecting said chamber with the interior of said tyre.